(12) United States Patent
Werner et al.

(10) Patent No.: US 6,705,025 B2
(45) Date of Patent: Mar. 16, 2004

(54) BOTTOM ELEMENT FOR A DEVICE FOR TREATING PARTICULATE MATERIAL

(75) Inventors: Thomas Werner, Rümmingen (DE); Martin Gross, Steinen (DE)

(73) Assignee: Huttlin GmbH, Steinen (DE)

( * ) Notice: Subject to any disclaimer, the term of this patent is extended or adjusted under 35 U.S.C. 154(b) by 0 days.

(21) Appl. No.: 10/256,536

(22) Filed: Sep. 27, 2002

(65) Prior Publication Data

US 2003/0070318 A1 Apr. 17, 2003

Related U.S. Application Data

(63) Continuation of application No. PCT/EP01/03379, filed on Mar. 24, 2001.

(30) Foreign Application Priority Data

Mar. 29, 2000 (DE) .......................................... 100 15 597

(51) Int. Cl.$^7$ ................................................ F26B 17/00
(52) U.S. Cl. .............................. 34/594; 34/582; 34/593
(58) Field of Search .......................... 34/582, 585, 593, 34/594, 168

(56) References Cited

U.S. PATENT DOCUMENTS

| | | | | |
|---|---|---|---|---|
| 3,527,575 A | | 9/1970 | Thompson et al. | 422/143 |
| 3,731,393 A | | 5/1973 | Okada et al. | 34/369 |
| 3,772,999 A | * | 11/1973 | Miller et al. | 110/245 |
| 4,475,467 A | | 10/1984 | Korenberg | 110/245 |
| 4,530,169 A | * | 7/1985 | Okawara | 34/582 |
| 4,588,366 A | * | 5/1986 | Glatt | 425/222 |
| 4,681,676 A | * | 7/1987 | Heidinger et al. | 209/380 |
| 4,759,884 A | | 7/1988 | Michimae et al. | 261/113 |
| 4,970,804 A | | 11/1990 | Hüttlin | 34/589 |
| 5,210,962 A | * | 5/1993 | Jones, Jr. | 34/168 |

FOREIGN PATENT DOCUMENTS

| | | |
|---|---|---|
| DE | 2129 186 | 12/1971 |
| DE | 36 13 362 A1 | 10/1987 |
| DE | 43 31 544 A1 | 3/1995 |
| DE | 195 28 584 A1 | 2/1997 |
| EP | 0 370 167 | 5/1990 |
| EP | 0 512 147 A1 | 11/1992 |
| EP | 0 544 289 A2 | 6/1993 |
| GB | 937569 | 9/1963 |

OTHER PUBLICATIONS

Abstract of Japanese Publication No. 55068506, May, 1980, Babcock Hitachi KK (Applicant), Nishimoto Yoshihide (Inventor).

* cited by examiner

*Primary Examiner*—Ira S. Lazarus
*Assistant Examiner*—Kathryn S. O'Malley
(74) *Attorney, Agent, or Firm*—Harness, Dickey & Pierce, P.L.C.

(57) ABSTRACT

A bottom element for a device for treating particulate has a two-dimensional body having numerous apertures. Means for imposing to a treatment medium passing said bottom are provided. Said bottom being designed as blade-shaped body, said apertures being designed as slots, said slots being generated by a removal of material from said plate-shaped body. Said slots having side walls sloping towards a plane of said body. For facilitating a cleaning of said bottom said side walls of said slots further consecutively tapers to a direction of a side of said bottom a particulate material rests.

15 Claims, 4 Drawing Sheets

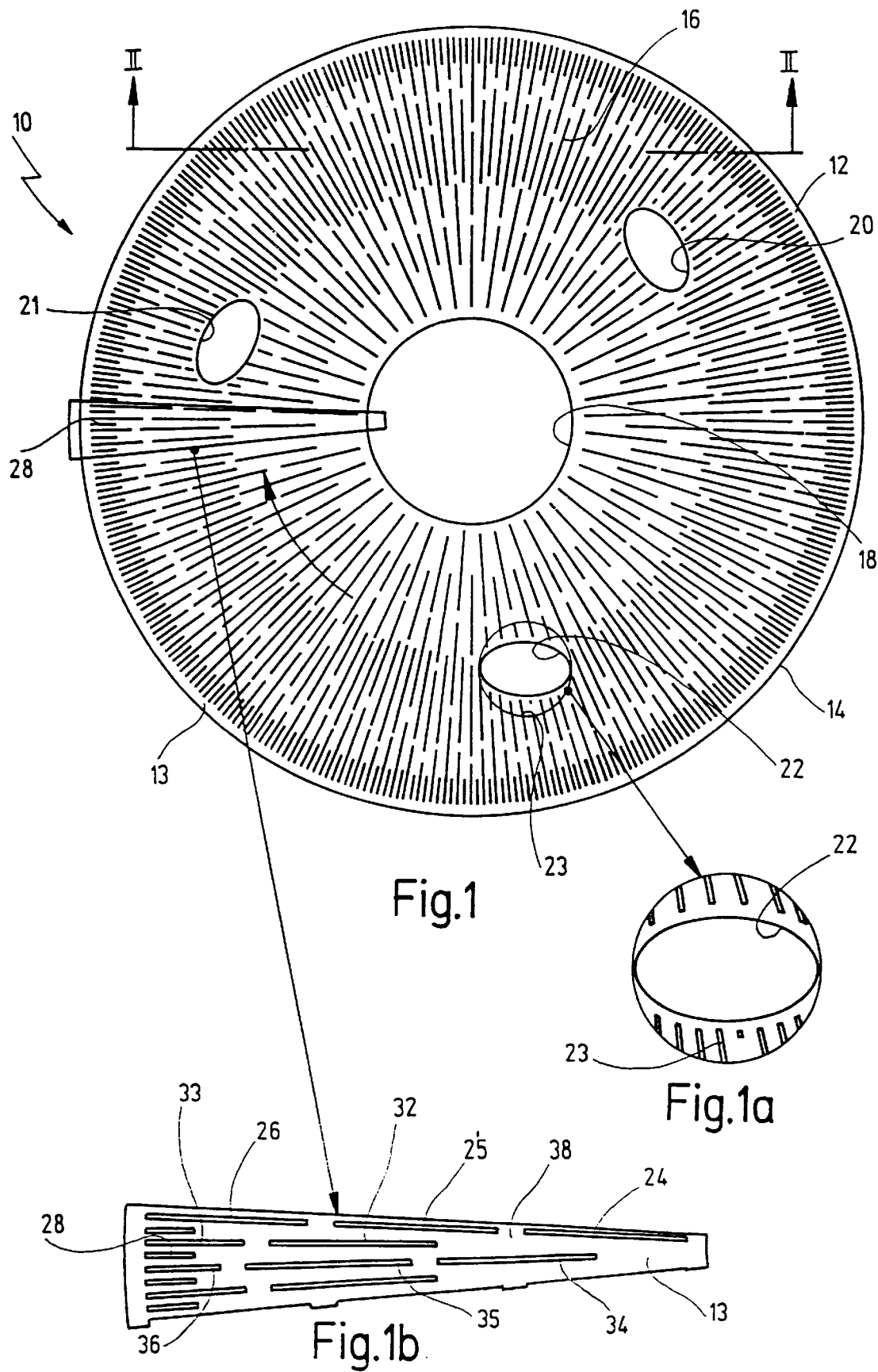

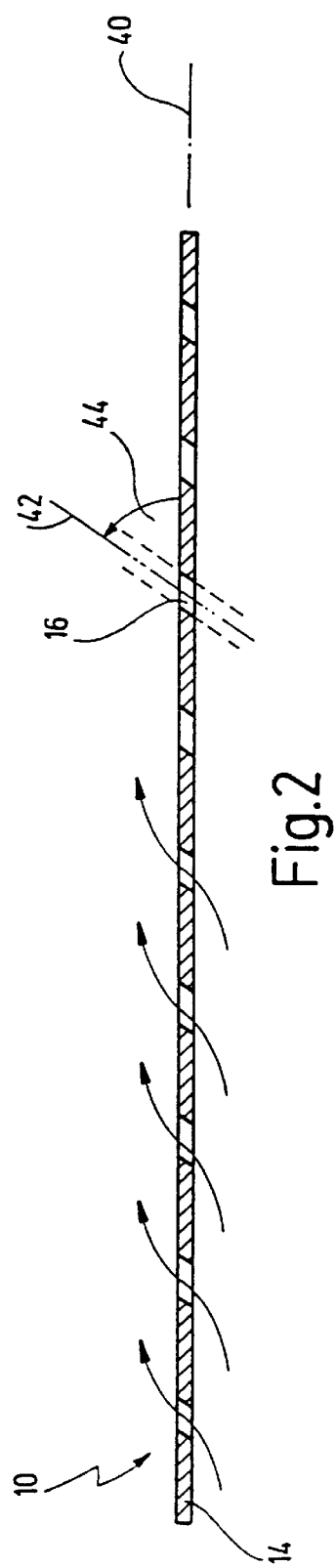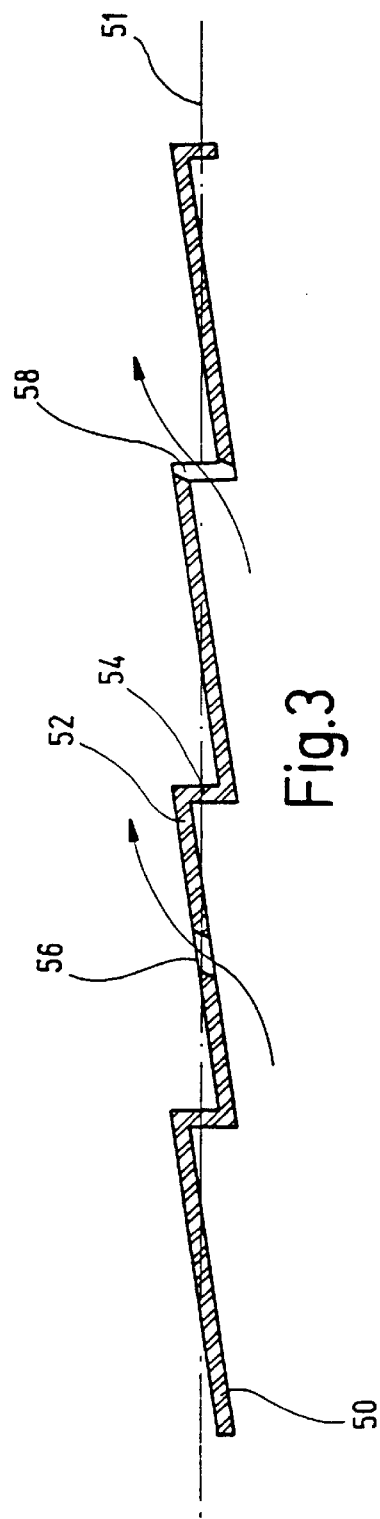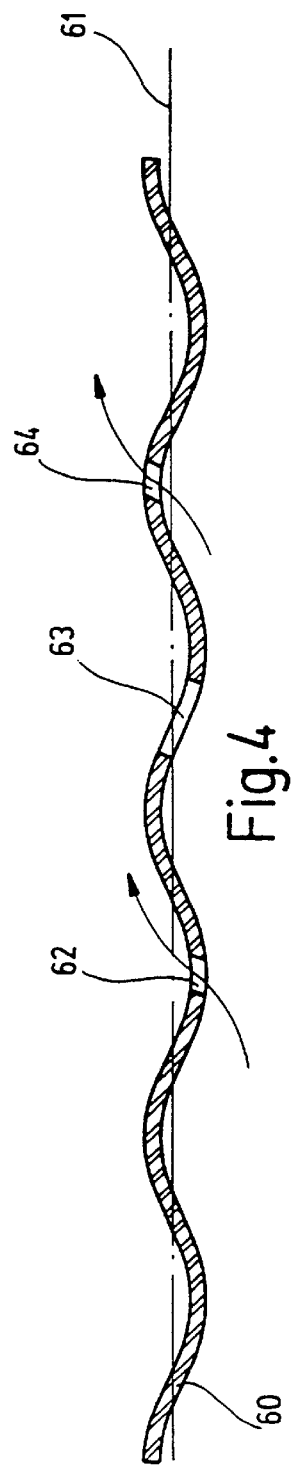

BOTTOM ELEMENT FOR A DEVICE FOR TREATING PARTICULATE MATERIAL

CROSSREFERENCE OF PENDING APPLICATION

This application is a continuation of pending international application PCT/EP01/03379 filed Mar. 24, 2001 and which designates the U.S.

BACKGROUND OF THE INVENTION

The invention relates to a bottom element for a device for treating particulate material, having a two-dimensional bottom, in which are provided numerous apertures, via which a treatment medium can be passed through the bottom, and having means that impose a motion component in the direction of the plane of the bottom on the treatment medium flowing through the bottom.

A device with a bottom element of this kind is known from EP 0 370 167 A1.

The device described in this document is used to dry, granulate or coat a particulate material.

In this case, a gaseous medium, referred to as process air, is, for example, introduced into a process chamber via the bottom, passing approximately horizontally and in the circumferential direction into the process chamber through the numerous apertures in the bottom.

In this device, the bottom comprises a ring of baffle plates, which extend radially and overlap one another circumferentially. Via the apertures formed in the overlapping region between the overlapping baffle plates, the treatment medium passes through the bottom and into the process chamber. The mutually overlapping baffle plates are set approximately horizontally or slightly obliquely and, as a result, impose a motion component in the direction of the plane of the bottom on the treatment medium flowing between the overlapping plates. Depending on the alignment of these baffle plates, the process air enters the process chamber more or less horizontally and in a circumferential direction. Owing to the initially horizontally directed component of the process air, the particulate material to be treated flows in the form of a rotating band of material on a kind of cushion of process air. Nozzles can be arranged in the bottom, between the baffle plates, in order to spray a liquid treatment medium on the particulate material to be treated.

The disadvantage with a bottom element of this kind constructed from overlapping baffle plates is that it is very expensive to manufacture. First of all, the approximately trapezoidal individual plates must be produced and assembled in the overlapping arrangement to give a ring.

The number of apertures for the passage of the treatment medium is thus determined by the number of plates. In the case of bottom elements with large diameters, there is the problem that the trapezoidal plates are very wide in the circumferential direction in the radially outer region. Since the treatment air or process air emerging from the apertures between the plates must accelerate the particles of material treated in the process chamber, a particle of material moving at a position disposed very radially outward is moved again in front of an aperture from which process air is emerging only after traveling a relatively long distance. A particle which is moving circumferentially more radially inwards, on the other hand, meets an aperture again after a much shorter distance of travel. Precautions therefore have to be taken to compensate for this. This was carried out in such a way, for example, that the height of the aperture between two overlapping baffle plates was made larger in the radially outward direction, e.g. by raising the overlapping baffle plate obliquely as seen in the radially outward direction. This then enabled more process air to emerge in radially outer regions in order to achieve acceleration motion components in the region of two successive apertures that were as similar as possible.

However, this had the effect that, in the case of bottom elements of large diameter, the radially outer plates are raised, thus presenting mechanical resistance surfaces to the material to be treated. Since such devices are used especially in the pharmaceutical sector, there was therefore the risk, when coating tablets for example, that there would be spalling on the tablets owing to collisions with these raised radially outer regions of the baffle plates. The distribution of the treatment medium, whether a gaseous or liquid medium or one containing solids, or a mixture of these, is thus not optimal. The relatively large apertures between the plates entail the risk that the material will fall through the bottom.

It is therefore the object of the present invention to provide a remedy here and to provide a bottom element of the type stated at the preamble which can be produced in a simple manner in terms of manufacturing technology and allows optimum guidance of the treatment medium.

SUMMARY OF THE INVENTION

According to the invention, the object is achieved by virtue of the fact that the bottom is designed as a plate-shaped body, said apertures are designed as slots, said slots have been generated by a removal of material from said plate-shaped body, and wherein said slots have side walls sloping towards the plane of the bottom, thereby imposing to the treatment medium said motion component when passing said slots. For facilitating a cleaning of said bottom, said side walls further consecutively taper to a side of the bottom the particulate material rests.

In terms of manufacturing technology, these measures have the advantage that it is now no longer necessary to produce individual baffle-plate elements, which then have to be assembled in an involved process to form a bottom, but that only a two-dimensional bottom has to be provided, from the material of which the numerous slots are then formed by removal of material. This makes it possible to select the number, shape, length, width, angle of inclination and pattern of the slots as a function of the treatment process and of the product to be treated. The motion component in the direction of the plane of the bottom is produced by virtue of the fact that the aperture cross sections of the slots slope in an appropriate manner.

This now allows significantly greater variation as regards the guidance of the process air. Thus, it is possible, for example, for a large number of relatively narrow slots to be provided, through which the process air can then be uniformly distributed and motion component aligned at the appropriate angle of inclination or in the direction of the plane of the bottom. The numerous relatively narrow slots prevent the material from falling through the bottom down to a size of material corresponding to the width of the slots. In the case of a circular or annular bottom, an appropriate number of slots can then be made in the radially outer regions in order thereby to compensate for the longer circumferential path in radially outer regions.

In terms of manufacturing technology, such removal of material can be carried out rapidly, easily and with high precision, e.g. by laser cutting, water-jet cutting, by combinations of these methods, by erosive methods or even by milling.

This simple structure also allows the possibility of providing different bottom elements for one apparatus, allowing optimum treatment of the particulate material depending on its size, whether it is, for example, fine powder or oblong tablets in the centimeter range. Rapid exchange of the bottom element is easily possible by virtue of the simplicity of the design.

The necessary cleaning too, which must meet high standards especially in pharmaceutical technology, is made considerably easier since there is not a large number of individual parts assembled to form an overlapping ring but a single plate-shaped body, in which corresponding slots have been made.

Due to the consecutively tapering of the side walls of the slots in a direction to that side of the bottom, the particulate material rests, no particles can enter into a slot and obstruct it.

If a particle having a size smaller than the width of the slot enters the slot at the side the particles are present, this particle will fall through the slot downwards but does not obstruct it, since in the downwards direction the side walls diverge.

In a further embodiment of the invention, the slots run in a straight line.

Slots of this kind are particularly simple to make in terms of manufacturing technology, and the straight-line geometry of the slots allows regular slot patterns, in particular slot patterns aligned in parallel.

In further embodiments, the slots are curved.

This measure has the advantage that longer slots can be made on a surface element through the curvature than with just a straight-line slot, making this measure particularly advantageous when as large as possible an exit area for certain predetermined parameters, e.g. slot width, is to be achieved per surface element.

In a further embodiment of the invention, the slots extend toward a central center of the bottom.

This alignment then allows guidance of the air in a circle on the bottom, possibly with the formation of a toroidally rotating band, a geometry which has proven particularly favorable for the treatment of particulate material.

In a further embodiment of the invention, in the case of a circular bottom, the slots extend radially.

This slot pattern is particularly favorable to the formation mentioned above of a circular, toroidally rotating band of material.

In a further embodiment, the further the slots are from the center, the more of them there are in the circumferential direction.

This measure has the advantage that the provision of an increasing number of slots compensates for the differences in distance traveled between particles of material circulating more radially inwards and particles of material circulating more radially outwards. In other words, a particle of material circulating radially outwards crosses a slot approximately after the same distance as a particle circulating radially inwards, and the particles can thus be accelerated uniformly. This leads to uniform treatment of the material, irrespective of whether a particle of material is being moved radially further toward the inside or radially further toward the outside.

In a further embodiment, there is a row of slots lying close together in the outer circumferential region.

This measure has the advantage that the critical transitional zone between the outer circumferential edge of the bottom and the housing accommodating the latter is virtually blown free by virtue of the large number of slots, excluding the possibility that material will gradually accumulate in this angular zone.

In a further embodiment of the invention, there are openings in the bottom to accommodate spray nozzles.

This measure then allows additional treatment of the material with a liquid sprayed medium, directly in the region of the bottom, when coating for example.

In a further embodiment of the invention, there are slots in the bottom that at least partially surround the openings in the region of these openings.

This measure has the advantage that optimum flow conditions around the nozzles can be created in a specifically intended manner by the provision of slots in the area surrounding these openings for the nozzles, thus preventing the accumulation of material in the reduced-pressure region surrounding the nozzles, the surrounding area thus being kept free by the provision of these additional slots. This is in fact possible because these additional slots can be made very easily in terms of manufacturing technology.

In a further embodiment of the invention, the bottom is flat.

This measure has the advantage that there is a particularly homogeneous surface without mechanical obstructions for the product.

In a further embodiment of the invention, the bottom is contoured.

This measure is advantageous if undulating movements are desired, or unwanted undulating movements can be compensated for by appropriately contoured bottoms.

In a further embodiment of the invention, the bottom is rotatable.

This measure has the advantage that the rotary motion provides an additional variation parameter for moving the material. Rotation of such a simple component as the bottom element is considerably easier to accomplish than assembly of different baffle plates.

In a further embodiment of the invention, a longitudinal center line of the aperture cross section is at an acute angle to the plane of the bottom, preferably in the region of 5° to 85°, most preferably in a range of 30° to 60°.

In these annular ranges, optimum treatment results can be achieved for a large range of material to be treated.

In a further embodiment of the invention, a plurality of slots, which are separated from one another by bridges of material, are arranged in series as seen in the direction of extension of the slots.

This measure has the advantage that, although a multiplicity of slots can be provided, the bottom still has adequate mechanical stability thanks to the bridges of material between the slots.

In a further embodiment of the invention, the bottom is annular and a cone is provided centrally on the side of the outflowing treatment medium.

This assembly allows the formation of the toroidally rotating band on an annular bottom in a particularly favorable manner. This compact construction element can also be used, for example, to convert existing systems operating on this principle.

It is self-evident that the features mentioned above and those that will be explained below can be used not only in the combination indicated but also in other combinations or alone without exceeding the scope of the present invention.

BRIEF DESCRIPTION OF THE DRAWINGS

The invention is described and explained in greater detail below in conjunction with the attached drawings with reference to a number of selected exemplary embodiments. In the drawings:

FIG. 1 shows a plan view of a bottom element according to the invention,

FIG. 1a shows an enlarged plan view in the region bounded by a circle in FIG. 1, FIG. 1b shows an enlarged fragmentary plan view in the ring segment region defined in FIG. 1, FIG. 2 shows a section along the line II—II in FIG. 1, FIG. 3 shows a sectional representation, comparable to the sectional representation in FIG. 2, of another exemplary embodiment with a contoured bottom, FIG. 4 shows an illustration, comparable to the sectional representation in FIG. 2, of another configuration of a bottom element with a waved bottom.

DETAILED DESCRIPTION OF PREFERRED EMBODIMENTS

Figure 5:
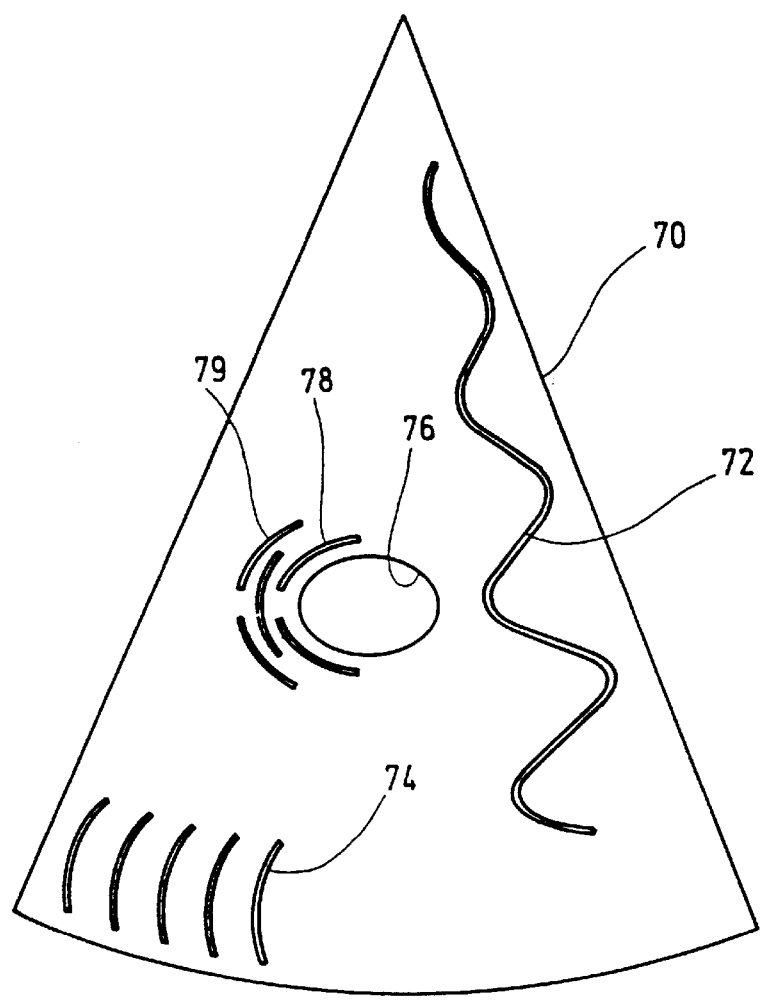
FIG. 5 shows a plan view of a disk segment of another exemplary embodiment of a bottom according to the invention with various slot geometries.

A bottom element illustrated in FIGS. 1 and 2 is denoted overall by the reference numeral 10.

The bottom element 10 comprises a two-dimensional bottom 12, which has a body 13 in the form of a disk 14. A large number of apertures shaped as slots 16, whose configuration, geometry, arrangement and the like are described in greater detail below, are made in the body 13, which is composed of metal, by means of a method involving the removal of material.

A circular central hole 18 is provided in the body 13.

Three elliptical openings 20, 21, 22 are furthermore arranged uniformly in the circumferential direction halfway along the radius, allowing nozzles to be pushed through them, as will be described later.

FIG. 1a shows that the slots, which are represented here by slot 23, end just before the corresponding openings, in this case opening 22. The slot pattern in the disk 14 will be described in greater detail with reference to the ring segment, which is defined in FIG. 1 and illustrated on a larger scale in FIG. 1b.

Three rectilinear slots 24, 25 and 26 extend along a radius from a central center of the disk 14 (not denoted specifically here).

Slots 24 and 25 are separated from one another by a web 38 of material, i.e. there is not one completely continuous slot in the radial direction but a plurality of slots in series.

This serves to maintain adequate mechanical stability of the disk 14.

A circumferential row 28 of relatively short slots is made in the outer circumferential end region, these slots ending a short distance from the circular outer circumferential edge of the disk 14. A row of two slots 32 and 33 arranged in series is provided in a position circumferentially adjacent to the row of three slots 24, 25 and 26. These slots 32 and 33 likewise extend along a radius and are separated from one another by a bridge of material (not denoted specifically here). The arrangement and longitudinal extent is such that slot 32 extends across the bridge of material between adjacent slots 25 and 26.

The radially outer end region of slot 33 fits into the circumferential row 28 of short slots.

Adjacent to the row of slots 32 and 33 there is then once again a row of three slots 34, 35 and 36 arranged in series along a radius. This slot pattern is then continued circumferentially. In the exemplary embodiment illustrated, the disk has a diameter of about 30 cm, while the width of the slots is 0.2 mm and the length of the slots is in a range of from about 32 mm to 10 mm in the case of the circumferential row 28 of short slots. The slots are each offset from one another by about 1° of the total circumferential angle of 360°, i.e. the outer circumferential row comprises 360 slots. Each of the slots ends about 2.5 mm from the outer circumferential edge and from the central aperture 18 and from the other openings 20, 21 and 22.

The cross-sectional view in FIG. 2 shows that the slots, represented by slot 16, are cut into the body 13 of the disk 14 in such a way that their aperture cross section 46 slopes relative to the plane 40 of the bottom. In the exemplary embodiment illustrated in FIG. 2, the aperture cross section 46, denoted by its longitudinal center line 42, is at an angle 44 of about 45° to the plane 40 of the bottom.

Figure 6:
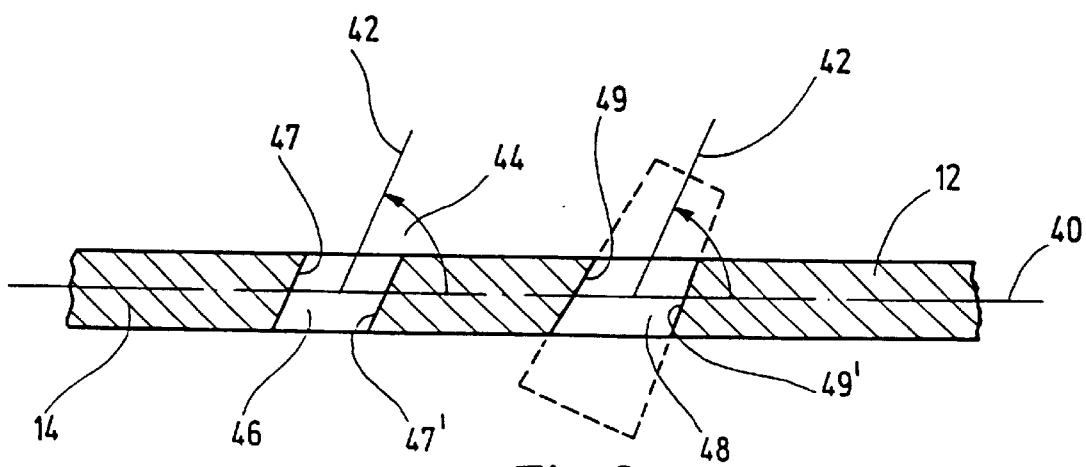
FIG. 6 shows a fragmentary sectional representation on a greatly enlarged scale corresponding to FIG. 2, an aperture cross section with parallel side walls being illustrated on the left-hand side, and an aperture cross section with tapering side walls being illustrated on the right-hand side.

This situation is illustrated again on an enlarged scale on the left-hand side of FIG. 6, that is to say therefore that the aperture cross section 46, which has the form of a parallelogram, has correspondingly sloping parallel side walls 47, 47'.

The aperture cross section tapers, in particular tapers conically, in one direction, as illustrated by the aperture cross section 48 in FIG. 6. The aperture cross section 48 is such that there are conical side walls 49, 49'. In FIG. 6, the cone is illustrated as a broken line. The axis of the cone then once again extends along the longitudinal center line 42 and is likewise at an angle of 45° to the plane 40 of the bottom. A particle having a size greater than the distance between the walls 49, 49' at the upper side cannot enter the cross section 48. A particle having a size approximately the distance of the walls 49, 49' at the upper side can enter but does not obstruct the cross section 48 since the cone widens to the lower side of the bottom 12. A cleaning liquid pushes out the particle assisted by the downwardly diverging cone.

If the flow through the bottom element 10 is from the bottom up, as illustrated in FIG. 2, the sloping aperture cross sections impose a motion component in the direction of the plane 40 of the bottom on the medium.

In other words, the medium does not flow from the bottom upward at a right angle to the plane 40 of the bottom but slopes in accordance with the slope of the aperture cross section.

There is thus the possibility of setting correspondingly desired flow conditions of the treatment medium passing through the bottom element 10 by means of the angle of inclination of the aperture cross section 46. Depending on the area of application, this treatment medium can be gaseous, liquid, pulverulent or a mixture of these.

The slots can be produced with a precise geometry and precise dimensions by laser cutting, but other methods, e.g. water-jet cutting or, in the case of an appropriately large slot width, milling, can also be employed.

The bottom element 10 described above comprised a flat disk.

FIGS. 3 and 4 illustrate the fact that the bottom can also be contoured to a certain extent.

Thus, the bottom 50 illustrated in FIG. 3, for example, comprises a number of sloping sections 52, which slope relative to the plane 51 of the bottom and are connected to one another by vertical sections 54. This bottom contour can be formed by embossing the bottom 50 with an embossing tool from an originally flat plate, for example.

Depending on requirements, the slots can then be provided in the sloping sections 52, as illustrated by slot 56 for example, or can be provided in the vertical sections 54, as represented by slot 58.

Here too, the aperture cross section is such that the latter slopes relative to the plane 51 of the bottom, with the result that a motion component in the direction of the plane 51 of the bottom is imposed on a treatment medium passing through the slots 56 and 58 in this case too, as indicated by the flow arrows.

In the case of the bottom 60 illustrated in FIG. 4, the latter is of waved construction, i.e. wave tips and troughs project above and below the plane 61 of the bottom. Here too, there are once again corresponding slots, it being possible for them to be provided in a wave trough, as illustrated by slot 62, in the transitional zone, as illustrated by slot 63, or in a wave tip, as illustrated by slot 64.

Here too, the aperture cross section is again such that this slopes relative to the plane 61 of the bottom, with the result that, here too, a motion component in the direction of the plane 61 of the bottom is again imposed on the treatment medium flowing through the slots 62, 63, 64, as indicated by the flow arrows.

The slots illustrated in this exemplary embodiment can also be made by laser cutting or the like. It is also possible to punch out these slots already during the forming of the bottoms, if the material and size permits.

FIG. 5 shows a circular segment of a disk-shaped bottom 70, which is likewise of flat design.

The slots extending toward the central center, not denoted specifically here, are designed as wavy slots 72, the waviness of which increases from the center to the radially outer end. This increase in waviness makes it possible to compensate for the ever-increasing circumferential propagation path in the radially outward direction.

FIG. 5 furthermore illustrates a circumferential row of short slots 74, which is situated a relatively long way out, which are curved approximately in the form of a circular arc. This curvature is advantageous if as large as possible an area of passage per element of area in combination with a relatively narrow slot is desired. This is the case, for example, if a very fine-grained product is being treated, in which case the slots should therefore be made as narrow as possible, in particular to avoid a situation where the product falls through the slots. The area of passage through a curved slot 74 is larger than the area of passage through a corresponding rectilinear slot connecting the two outer ends of the curvature in a straight line, for example.

An opening 76, through which a nozzle can be pushed, is made in the circular segment illustrated in FIG. 5.

In practice, it has been found that a certain vacuum is formed around the nozzles owing to the high exit velocity of the media sprayed, drawing in material, especially in the case of products in the form of fine dust, with the result that this proximate zone around the nozzle often becomes encrusted. To prevent this, a row of slots 78, 79 is provided around the opening 76, partially surrounding it in the direction of spraying and "blowing free" this critical zone. This demonstrates in a particularly impressive way the great variability and flexibility of the design configuration of the invention, i.e. appropriate additional slots can be provided to prevent accumulation of material precisely in the critical zones.

This is also the reason for providing the circumferential row 28 of small slots illustrated in FIG. 1.

The disk 14 is installed in a housing that extends approximately perpendicularly to the disk 14 and is connected to its circumferential edge. Product sometimes tends to adhere and become encrusted in this angle region, this now being eliminated by the circumferential row 28, i.e. this angle is continuously blown free by the medium passing through the circumferential row 28.

Figure 7:
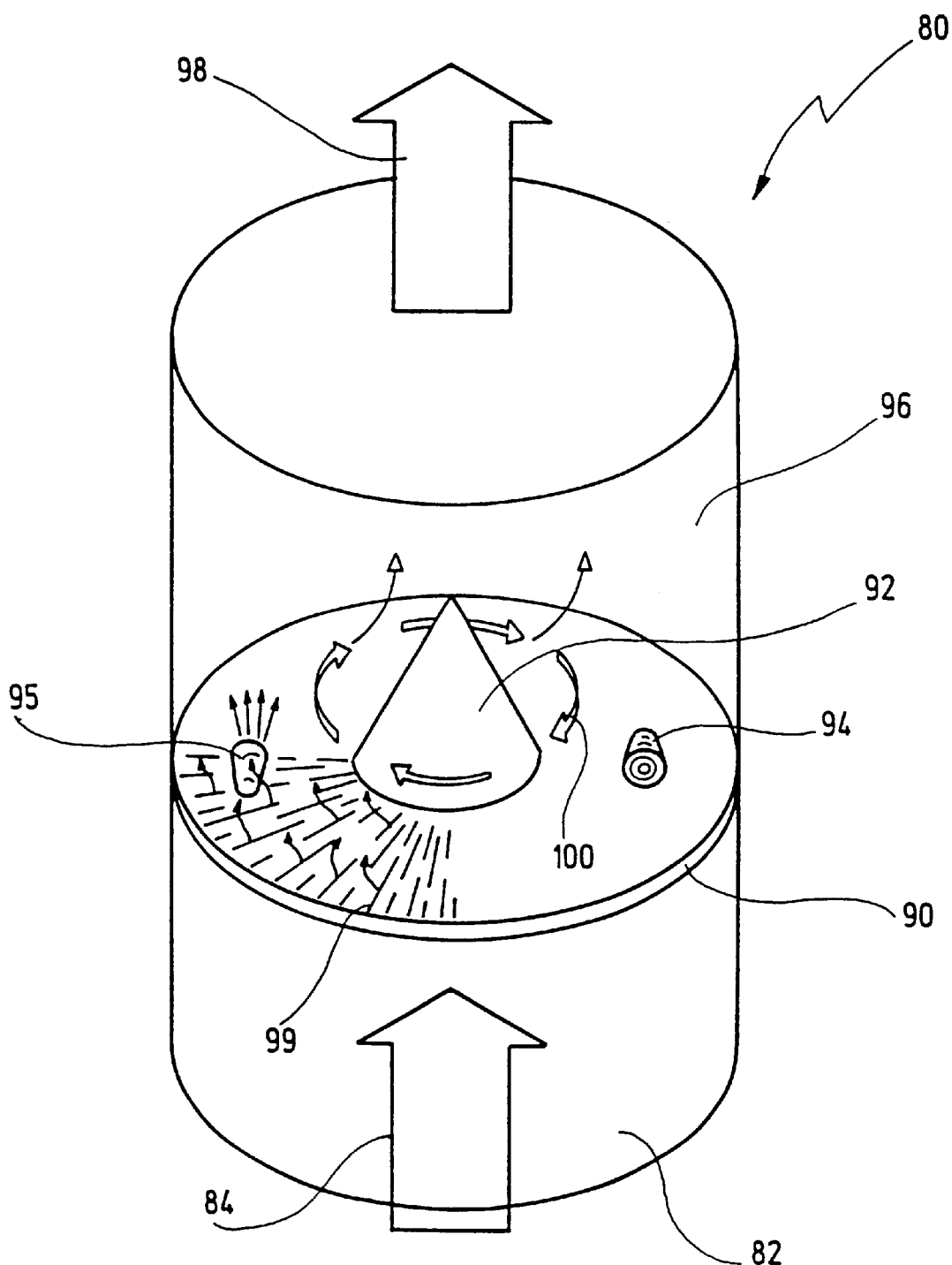
FIG. 7 shows, in a highly schematized form, a perspective view of a device for treating particulate material, in which a bottom element according to the invention is fitted.

FIG. 7 illustrates, in a highly schematized form, a device 80 in which a bottom element 90 according to the invention, the slot pattern 99 of which corresponds approximately to the slot pattern of the bottom element 10, is installed.

The device 80 has a lower inflow chamber 82, into which a treatment medium 84, e.g. warm process air, is introduced.

An upper end of the inflow chamber 82 forms the bottom element 90 with the slot pattern 99. A cone 92 is inserted into the central hole, more specifically on the side of the bottom element 90 on which the treatment medium 84 emerges.

Two diametrically opposite nozzles 94 and 95 are provided, purely by way of example, being pushed into the openings described above. The angle of inclination of the aperture cross sections of the slot pattern 99 is such that an annular motion component in the clockwise direction is imposed on the treatment medium 84 flowing through the bottom element 90. Above the bottom element 90 there is a treatment chamber 96, in which the material to be treated is accommodated. From the upper end of the treatment chamber, the process air is then discharged as exhaust air 98 after the treatment of the material. The filters and the like that are customary in such apparatuses have not been shown, for the sake of clarity.

If the device is operated, for example, for the purpose of granulating a fine powder, this powder is introduced into the treatment chamber 96 and initially rests on the upper side of bottom element 90. The narrowness of the slots prevents the product from falling through the slots into the inflow chamber 82. If the bottom element 90 is supplied with treatment medium 84, e.g. hot process air, this air passes through the bottom element 90, being directed circumferentially with a horizontal component by the slot pattern 99 with the innumerable slots, and produces a floating and toroidally rotating band of material above the top side of the bottom element 90, as indicated by the arrows 100. A liquid medium with adhesive properties is then sprayed through the nozzles 94 and 95, as a result of which the fine powder coagulates into granules.

What is claimed is:

1. A bottom element for a device for treating particulate material, comprising a two-dimensional bottom having numerous apertures, said apertures are provided for passing a treatment medium through said bottom, and means for imposing to said treatment medium passing said bottom a motion component in a direction of a plane of said bottom, wherein said bottom being designed as a plate-shaped body, said apertures being designed as slots, said slots being generated by a removal of material from said plate-shaped body, and wherein said slots have side walls sloping towards said plane of said body thereby imposing to the treatment medium said motion component when passing said slots, and wherein, for facilitating a cleaning of said bottom, said side walls further continuously taper to a direction of a side of said bottom a particulate material rests.

2. The bottom element of claim 1, wherein said slots run in a straight line.

3. The bottom element of claim 1, wherein said slots are curved.

4. The bottom element of claim 1, wherein said slots extend towards a center of said bottom.

5. The bottom element of claim 1, wherein said bottom is circular, and wherein said slots extend radially of said circular bottom.

6. The bottom element of claim 1, wherein the further away said slots are from a center of said bottom, the more of said slots are present viewed in a circumferential direction of said bottom.

7. The bottom element of claim 1, wherein a row of slots is disposed close together in an outer circumferential region of said bottom.

8. The bottom element of claim 1, wherein openings are provided in said bottom for accommodating spray nozzles.

9. The bottom element of claim 8, wherein slots are provided at least partially surrounding said openings for accommodating said spray nozzle in a vicinity of said openings.

10. The bottom element of claim 1, wherein said bottom is flat.

11. The bottom element of claim 1, wherein said bottom is contoured.

12. The bottom element of claim 1, wherein said bottom is rotatable.

13. The bottom element of claim 1, wherein a longitudinal center line of an aperture cross section is at an acute angle to said plane of said bottom in a range of 5° to 85°, preferably in a range of 30° to 60°.

14. The bottom element of claim 1, wherein a plurality of slots, which slots are separated one from another by bridges of material of said bottom, are arranged in series as seen in a direction of extension of said slots.

15. The bottom element of claim 1, wherein said bottom is annular and wherein said bottom is provided centrally with a cone on that side said treatment mediums flowing out of said bottom.

* * * * *

UNITED STATES PATENT AND TRADEMARK OFFICE
CERTIFICATE OF CORRECTION

PATENT NO. : 6,705,025 B2
DATED : March 16, 2004
INVENTOR(S) : Thomas Werner et al.

It is certified that error appears in the above-identified patent and that said Letters Patent is hereby corrected as shown below:

Column 8,
Line 64, after "passing" insert -- through --.

Column 9,
Line 10, after "bottom" insert -- on which --.

Signed and Sealed this

Fifteenth Day of June, 2004

JON W. DUDAS
*Acting Director of the United States Patent and Trademark Office*